March 10, 1970 L. R. FOCHT 3,499,987

SINGLE EQUIVALENT FORMANT SPEECH RECOGNITION SYSTEM

Filed Sept. 30, 1966 4 Sheets-Sheet 1

INVENTOR.
LOUIS R. FOCHT
BY Leonard Zalman
ATTORNEY

SINGLE EQUIVALENT FORMANT SPEECH RECOGNITION SYSTEM

INVENTOR.
LOUIS R. FOCHT
BY Leonard Zalman
ATTORNEY

March 10, 1970 L. R. FOCHT 3,499,987

SINGLE EQUIVALENT FORMANT SPEECH RECOGNITION SYSTEM

Filed Sept. 30, 1966 4 Sheets-Sheet 3

INVENTOR.
LOUIS R. FOCHT

BY Leonard Zolman

ATTORNEY

SINGLE EQUIVALENT FORMANT SPEECH RECOGNITION SYSTEM

INVENTOR.
LOUIS R. FOCHT

BY Leonard Z. Zelman

ATTORNEY

United States Patent Office 3,499,987
Patented Mar. 10, 1970

3,499,987
SINGLE EQUIVALENT FORMANT SPEECH RECOGNITION SYSTEM

Louis R. Focht, Huntingdon Valley, Pa., assignor to Philco-Ford Corporation, Philadelphia, Pa., a corporation of Delaware Filed Sept. 30, 1966, Ser. No. 583,293
Int. Cl. H04m *3/40*
U.S. Cl. 179—1 4 Claims

ABSTRACT OF THE DISCLOSURE

A speech recognition system which produces, in response to an electrical signal representative of a speech wave, control signal consisting of (i) a first signal representative at any given time of the period of the first major oscillation of the electrical signal occurring after that pitch pulse of said speech wave which immediately precedes said given time, (ii) a second signal representative at said given time of the peak amplitude of said major oscillation, and (iii) a voicing signal. Each of those signals is supplied to a different feature extractor network which produces at its output terminals a group of signals each of which is representative of a different characteristic of the control signal supplied thereto. Combinations of the output terminals of the feature extractor networks are connected to inputs of gating networks which produce an output signal only when an appropriate signal is present at each of said inputs. Hence such an output signal indicates that the speech wave has a specified combination of features characteristic of a word. Different combinations of those features are detected to identify different words.

Figure 1:
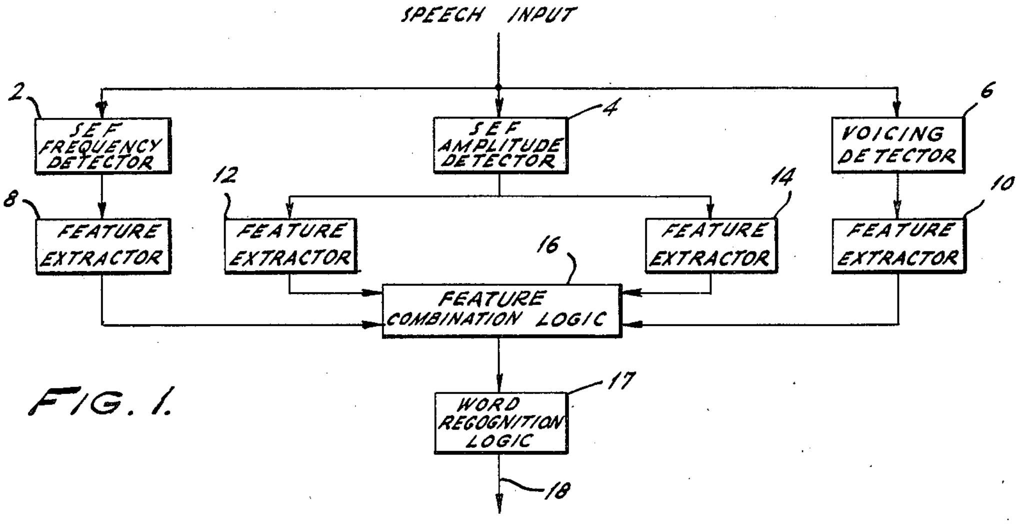

To date, speech recognition systems have not been successful. One severe limitation of prior speech recognition systems has been the large number of speech parameters that the recognition system must handle. Promising parameters that have been used in prior art speech recognition systems are the frequencies of the first three formants of the speech wave and their respective amplitudes. Formants describe the vocal tract resonances of the speech waves. This resonance information constitutes six apparently independent parameters whose pattern of movement and position are ultimately used as the inputs to a speech recognition system. A seventh parameter, voicing, is also necessary for accurate speech recognition. The voicing parameter indicates the amount of harmonically related energy in a speech wave.

While it has been thought necessary that all of the above-mentioned parameters be processed for the accurate recognition of words, I have discovered that words can be reicgnized from fewer and different speech parameters. It is obvious that, from the standpoint of simplicity of the ultimate speech recognition systems, the fewer the number of parameters thta must be handled the better.

Another reason for the failure of prior art speech recognition systems is the difficulty of finding incremental speech sounds that contain sufficient information regarding the characteristics of the speech wave to permit reliable recognition. To date, the most promising speech element for this purpose has been the phoneme.

Phonemics teach that all English sounds can be analyzed into a surprising small dictionary of incremental speech sounds called phonemes. It has been estimated that all English sounds can be represented by approximately 40 phonemes, much as written English can be represented by 26 alphabetical characters. Therefore the entire speech recognition process can be vastly simplified by providing means for recognizing individual phonemes and then identifying words by identifying know combinations of the recognized phonemes.

It is therefore an object of the present invention to provide a novel speech recognition system.

It is a further object of the present invention to provide a novel speech recognition system that uses fewer speech parameters than prior art speech recognition systems.

It is another object of the present invention to provide a speech recognition system that uses phoneme recognition.

According to the present invention the three formant frequency parameters and the three formant amplitude parameters of the prior art speech recognition systems are replaced by two new parameters. The two new parameters are the frequency and amplitude of the single equivalent formant of the speech wave. These two new parameters contain most of the phonetic information of the original six parameters of the original speech wave. According to one embodiment of the present invention, signals representative of selected characteristics of the single equivalent formant speech parameters are supplied to a word recognition system.

In a preferred embodiment of the present invention, signals representative of selected characteristics of the single equivalent formant speech parameters are supplied to a phoneme recognition system, the output signals of which are supplied to a word recognition system. The single equivalent formant parameters are quantized to simplify the design of the phoneme recognition circuits.

Figure 2:
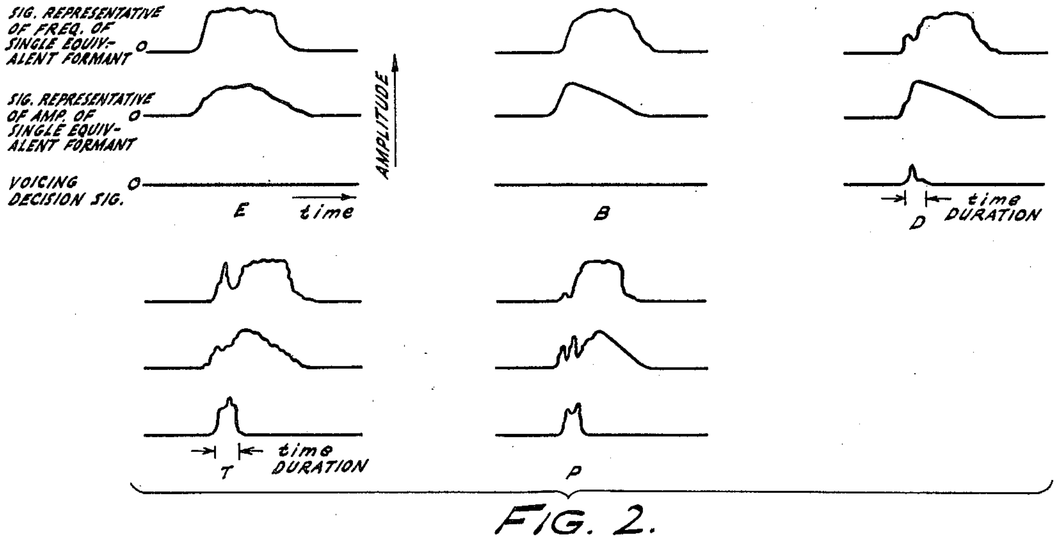
Figures 4, 4A:
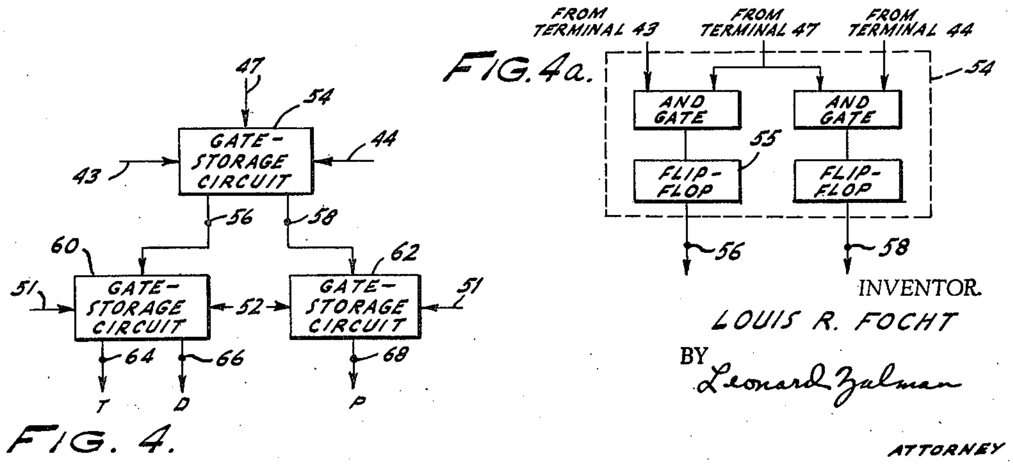
Figure 1A:
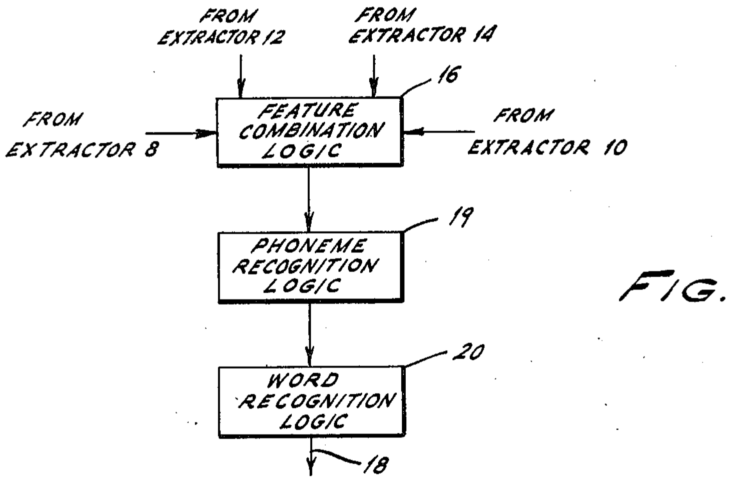
Figure 5:
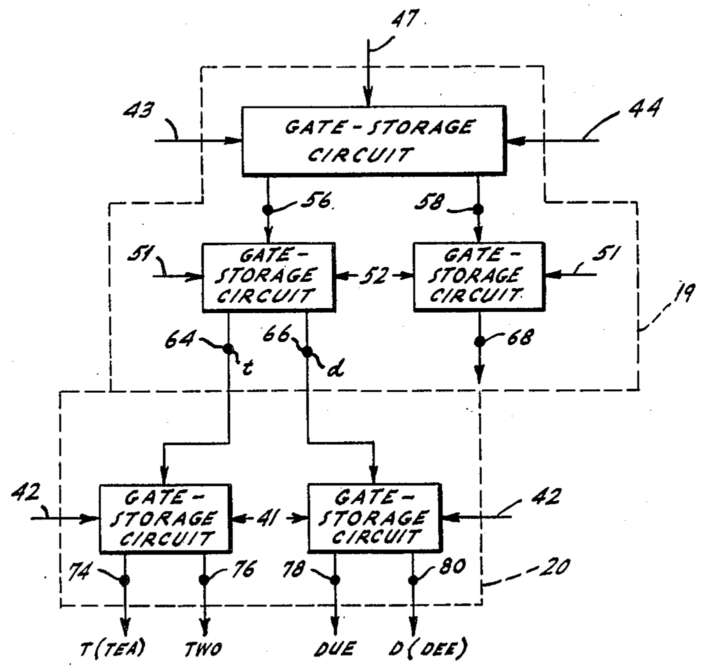
Figure 5A:
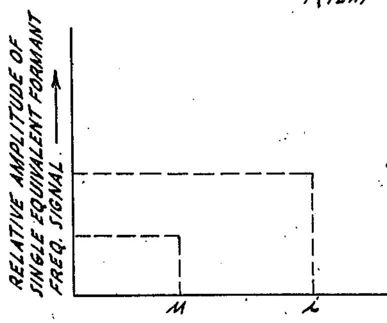
Figure 3:
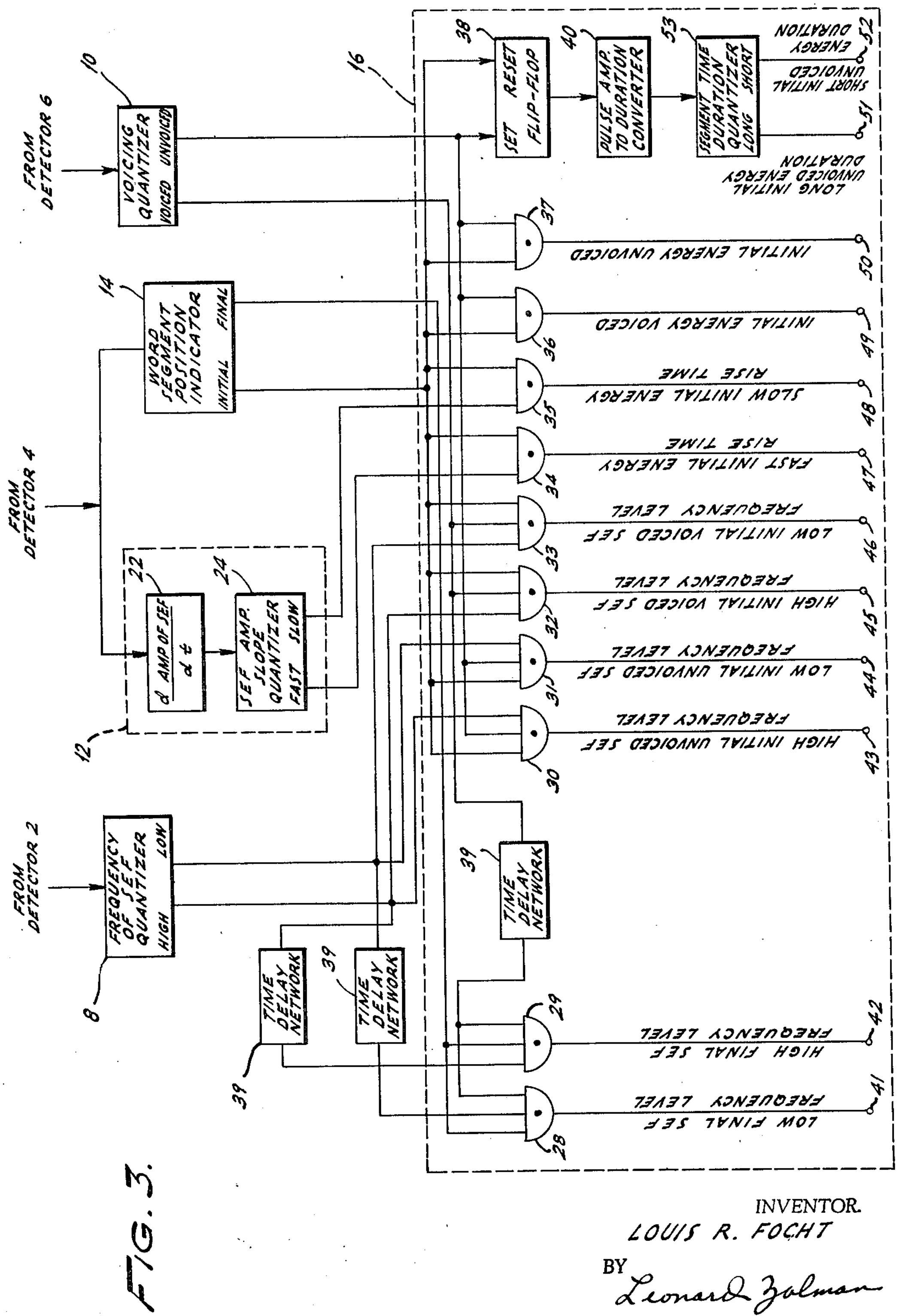
Figure 6:
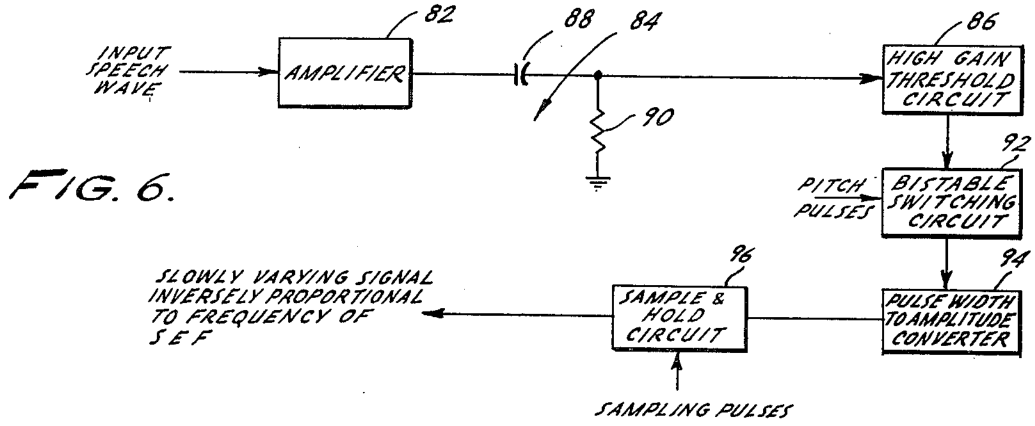
Figure 8:
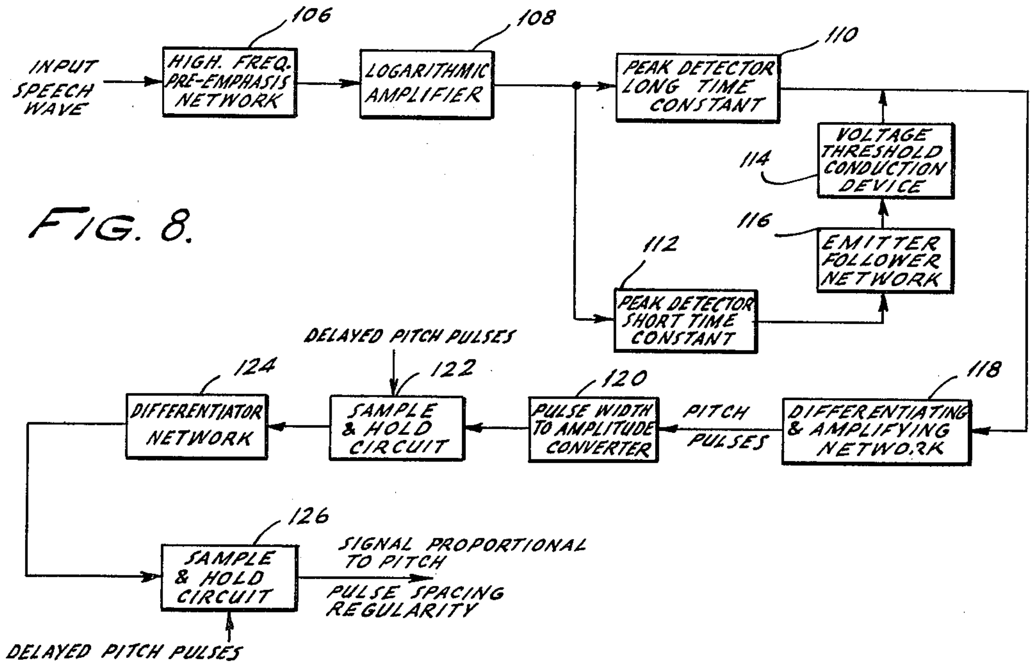
Figure 7:
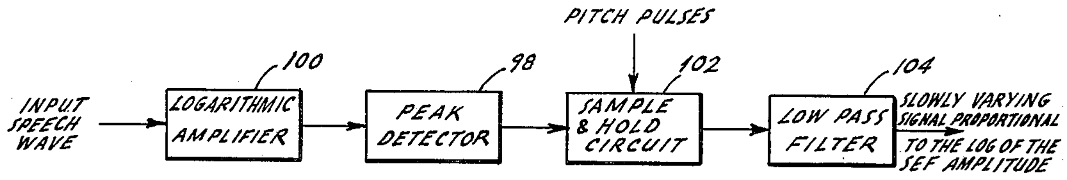

The above objects and other objects inherent in the present invention will become more apparent when read in conjunction with the following specification and drawings in which:

FIG. 1 is a block diagram of a word recognition system of the present invention;

FIG. 1*a* is a block diagram of a portion of a phoneme-word recognition system of the present invention;

FIG. 2 is a graph showing waveforms of the single equivalent formant parameters for five letters of the alphabet;

FIGS. 3, 4, and 4*a* are typical schematic block diagrams of portions of the system of FIG. 1;

FIG. 5 is a typical schematic block diagram of portions of the system of FIG. 1*a*;

FIG. 5*a* is a graph showing the relative amplitudes of the single equivalent formant frequency signals for the phonemes i and u and, FIGS. 6 through 8 are block diagrams of components of the system of FIG. 1.

The block diagram of FIG. 1 shows a speech recognition system according to the present invention that can recognize a word vocabulary. An electrical representation of a speech wave, such as produced by a standard telephone carbon microphone (not shown), is supplied to a single equivalent formant frequency detector 2, a single equivalent formant amplitude detector 4, and a voicing detector 6.

FIG. 6 is a block diagram of a preferred form of the single equivalent formant frequency detector 2 of FIG. 1. It comprises a circuit for measuring the period of the first major oscillation of a complex speech wave after each pitch pulse thereof and hence, the inverse of the frequency of the single equivalent formant. The electrical signal representative of the input speech wave is supplied through an amplifier 82 and a high frequency pre-emphasis network 84 to the input of a high gain threshold circuit 86, such as a Schmitt trigger. Network 84, which includes a capacitor 88 and a resistor 90, acts as a differentiator, emphasizing the high frequency components of the input speech wave. High gain threshold circuit 86 is set to produce an output signal only in response to one polarity of the differentiated input speech wave. The output signal of circuit 86 is supplied to one input terminal of a bistable switching circuit 92. Pitch pulses are supplied to a second input terminal of circuit 92. Such pitch pulses are produced by network 118 of the arrangement of FIG. 8, described hereinafter. Bistable switching circuit 92 is coupled by means of a pulse width-to-amplitude converter 94, which may take the form of a ramp generator, to the input of a sample and hold circuit 96. The output of sample and hold circuit 96 is a signal of slowing varying amplitude, the instantaneous amplitude of which is inversely proportional to the frequency of the single equivalent formant.

FIG. 7 is a block diagram of a preferred form of the single equivalent formant amplitude detector 4 of FIG. 1. The input speech wave is supplied to a peak detector 98 via a logarithmic amplifier 100. A sample and hold circuit 102 is coupled to peak detector 98 and to a low pass filter 104. Pitch pulses gate the sample and hold circuit 102 to effect measurement of the logarithm of the peak amplitude of the complex speech wave. Filter 104 removes the high frequency components from the output signal of circuit 102 thereby providing a slowly varying signal proportional to the logarithm of the amplitude of the single equivalent formant.

FIG. 8 is a block diagram of a preferred form of the voicing detector 6 of FIG. 1, comprising a circuit for extracting from the input speech wave the pitch pulses mentioned hereinbefore. The input speech wave is supplied via a high frequency pre-emphasis network 106 to a nonlinear or logarithmic amplifier 108. The output of amplifier 108 is coupled to a peak detector 110 which has a long time constant and to a peak detector 112 which has a short time constant. Peak detector 112 is coupled by a voltage threshold conduction device 114, such as a Zener diode, and an emitter follower network 116 to the output of peak detector 110 which is coupled to a differentiating and amplifying network 118. Since the potential difference between the output signals of detectors 110 and 112 is small immediately after a pitch pulse of the speech wave, voltage threshold conduction device 114 does not conduct immediately after the occurrence of a pitch pulse. Hence those harmonic peaks in the input speech wave which occur immediately after a pitch pulse are not detected. When the potential difference between the output signals of detectors 110 and 112 is sufficient to initiate conduction of device 114 (i.e., at a time when said harmonic peaks no longer are present in the speech wave but before the next pitch pulse thereof), the peak detector follows the discharge characteristics of short time constant detector 112. Hence, at that time, the peak detector detects pitch pulses even when there is a rapid decrease in the amplitude of the input speech wave. Accordingly, the output signal of network 118 comprises pulses the repetition rate of which is the same as the pitch rate of the input speech wave.

The output signal of network 118, i.e., the pitch pulses, is supplied via a pulse width-to-amplitude converter 120, such as a ramp generator, to the input of a first sample and hold circuit 122. A differentiator network 124 couples sample and hold circuit 122 to a second sample and hold circuit 126. Since the output signal of differentiator network 124 has amplitude peaks only when the repetition rate of the pitch pulses is irregular, the value of the output signal of circuit 126 is zero when the repetition rate of the pitch pulses is regular (voiced sounds) and other than zero when the repetition rate of the pitch pulses is irregular (unvoiced sounds).

The construction and operation of detectors 2, 4, and 6 are described in more detail in my copending U.S. patent application Ser. No. 582,605, filed Sept. 28, 1966.

The signals generated by detectors 2 and 6 are supplied to feature extractor networks 8 and 10, respectively, and the signal generated by detector 4 is supplied to feature extractor networks 12 and 14. Feature extractor networks 8, 10, 12, and 14 are designed to quantize pre-selected characteristics of the respective input signals. In the examples shown in the drawings, feature extractor network 8 quantizes the amplitude of the signal representative of the frequency of the single equivalent formant into two-amplitude levels, high and low. Feature extractor network 10 quantizes the amplitude of the voicing signal into two levels representative of voiced and unvoiced sounds. Feature extractor network 12 is designed to quantize the time rate of change of the amplitude of the signal representative of the amplitude of the single equivalent formant, and feature extractor network 14 is designed to quantize the amplitude of the signal representative of the amplitude of the single equivalent formant.

The output signals generated by feature extractor networks 8, 10, 12, and 14 are supplied to feature combination logic 16. In the examples chosen for illustration, logic 16 consists of a plurality of gating circuits, such as, for example, "AND" gates for producing a plurality of signals, each of which is representative of a plurality of predetermined speech characteristics, for example, fast initial energy rise time, low initial voiced single equivalent formant frequency level, and initial energy voiced.

Feature combination logic 16 is coupled to a word recognition logic 17. Recognition logic 17 is designed to recognize particular speech characteristic groupings and to identify sequences of these speech characteristic groupings as words. In the example chosen for illustration, logic 17 consists of a plurality of gating circuits coupled to each other through flip-flop circuits. Word recognition logic 17 has a plurality of output electrodes generally designated as 18. The number of output electrodes 18 corresponds to the vocabulary of words to be recognized. Output electrodes 18 may be coupled to machinery (not shown) that functions in response to the speech wave.

How the information from the extractor networks 8, 10, 12, and 14 is used to recognize words will be apparent when the circuit of FIG. 1 is analyzed in conjunction with FIG. 2. FIG. 2 shows the waveforms of the signals representative of the frequency and amplitude of the single equivalent formant and of the voicing decision signal for the five spoken words (alphabetical letters) E, B, D, T, and P. The words B, D, T, and P, as a group, are referred to as stop consonants. In FIG. 2, a purely voiced word is represented by a voicing signal of minimum amplitude.

Analysis of FIG. 2 shows the word E is differentiated from the stop consonants and other words, i.e., A, I, O, U, by the amplitude of the signal representative of the frequency of the single equivalent formant, the absence of a fast rise time in the amplitude of the signal representative of the amplitude of the single equivalent formant, and a voicing signal of minimum amplitude. Thus, after measuring the amplitude of the signal representative of the frequency of the single equivalent formant, the slope of the signal representative of the amplitude of the single equivalent formant, and the amplitude of the voicing signal, appropriate signal thresholds can be set for the extractor networks 8, 10, 12, and 14 that will differentiate the word E from the stop consonants and other words.

Examination of the single equivalent formant frequency and amplitude signals and the voicing signal of the word B shows a fast rise time in the amplitude signal and a voicing signal of minimum amplitude. These characteristics provide the information required to distinguish the word B from the other stop consonants and other words. The word D is recognized by the fast rise time in both the amplitude and voicing signals. These, however, are also the characteristic features of the word T and this necessitates the analysis of another characteristic of the voicing signal, the time duration of the unvoiced signal. The time duration of the signal is the period during which the signal has a positive amplitude. In the word D the time duration of the unvoiced portion of the voicing signal is shorter than it is in the word T. The remaining word, P, is differentiated by using various combinations of the measurements just described.

The characteristics previously described in the analysis of FIG. 2 are combined in combination logic 16 and recognized as words in word recognition logic 17. FIGS. 3 and 4 show typical circuits of the feature extractor networks 8, 10, 12, and 14, the feature combination logic 16, and the word recognition logic 17 that can be used to recognize the words T, D, P, and their homonyms, i.e., tea, dee, and pea, respectively. In FIGS. 3 and 4 components corresponding to the same components in FIG. 1 have been assigned to the same reference numerals.

Referring to FIG. 3 the feature extractor network 8 is a network, which includes a threshold conduction device, such as, for example, a Schmitt trigger, for measuring whether the amplitude of the signal representative of the frequency of the single equivalent formant is high or low. Extractor 8 has two output terminals, one corresponding to an amplitude of the input signal above the predetermined value (high) and the other corresponding to an amplitude of the input signal below the predetermined value (low).

Feature extractor network 10 is also a network which measures the amplitude of the input signal to determine whether the amplitude of the input signal is above or below a predetermined value. It also has two output terminals, one designating a voiced decision, corresponding to an amplitude below the predetermined value, and the other designating an unvoiced decision, corresponding to an amplitude above the predetermined value.

Feature extractor network 12 consists of a differentiator network 22 coupled to a quantizer 24 that measures the slope or rise time of the signal from network 22. Network 22 can be any conventional differentiator circuit and quantizer 24 can be a threshold conduction device having two output terminals. One output terminal corresponds to a fast rise time and the other terminal corresponds to a slow rise time of the amplitude of the signal representing the single equivalent formant amplitude.

Feature extractor network 14 is a network for determining whether a word segment is at the beginning or at the end of a word. It may consist of a threshold conduction device, an output signal of which is supplied to a conventional differentiator circuit. The differentiator circuit determines the polarity of the slope of the output signal supplied thereto. A positive slope indicates that the word segment is at the beginning (initial) of a word and a negative slope indicates that the word segment is at the end (final) of a word.

Preselected combinations of the output signals from the extractor networks 8, 10, 12, and 14 are coupled, as shown, to a plurality of "AND" gates 28 through 37. The signals supplied to the "AND" gates 28 and 29 from the high amplitude output terminal of feature extractor network 8 and from the voiced decision output terminal of feature extractor network 10 pass through conventional time delay networks 39. Since the determination of the position of a word segment in a word cannot be made until after the word segment has occurred, the signals supplied to gates 28 and 29 from network 14 are delayed in time relative to the other signals supplied to gates 28 and 29. Time delay networks 39 delay the other signals supplied to gates 28 and 29 and hence synchronize the application of the input signals to gates 28 and 29.

The unvoiced decision output signal of the feature extractor network 10 and the "initial" decision output signal of the network 14 are supplied as inputs to the set and reset terminals, respectively, of a flip-flop circuit 38, the output signal of which is supplied through a pulse width to amplitude converter 40, such as a ramp generator, to a segment duration quantizer 53. Quantizer 53, which may be a threshold conduction device having a predetermined threshold voltage, has two output terminals, one designating an input signal having an amplitude above the predetermined value (long time duration) and the other designating an amplitude below the predetermined value (short time duration).

The output signals appearing at output terminals 41 to 50 of "AND" gates 28 to 37, respectively, and at the output terminals 51 and 52 of quantizer 53 represent combinations of speech characteristics that are used as inputs to the word recognition logic 17.

Referring now to FIG. 4, signals from output terminals 43, 44, and 47 of FIG. 3 are supplied as inputs to a gate-storage circuit 54, a schematic block diagram of which is shown in FIG. 4*a*. The output terminals 56 and 58 of circuit 54 are connected as inputs to gate-storage circuits 60 and 62, respectively, which can be similar to circuit 54. Signals from output terminals 51 and 52 of FIG. 3 are also supplied as inputs to circuits 60 and 62. Circuit 60 has output terminals 64 and 66 and circuit 62 has an output terminal 68. The presence of an output signal at any one of the terminals 64, 66, or 68 of circuits 60 and 62 indicates that the word (T, D or P) corresponds to that terminal has been spoken.

It will be recalled that when the signals of FIG. 2 were analyzed the word D was characterized by a fast rise in the amplitude of the signal representative of the amplitude of the single equivalent format, a high initial value of the amplitude of the signal representative of the frequency of the single equivalent format, and a short time duration unvoiced decision signal. Therefore, when output signals are present at terminals 43, 47, and 52 of FIG. 3 and these signals, which represent all of the characteristics of the word D required for the vocabulary under investigation, are supplied to circuits 54 and 60 in the manner shown in FIG. 4, the signal appearing at terminal 56 of circuit being momentarily stored by the flip-flop circuit 55 of FIG. 4*a*, all of the characteristics of the word D will be detected and an output signal will momentarily appear at terminal 66 of FIG. 4. In a similar manner, if instead signals are present at terminals 43, 47, and 51 of FIG. 3 all of the characteristics of the word T will be detected and an output signal will momentarily appear at terminal 64 of FIG. 4 instead of terminal 66 and if instead signals are present at terminals 44, 47 and 51 of FIG. 3 all of the characteristics of the word P will be detected and an output signal will momentarily appear at terminal 68 of FIG. 4 instead of at either terminals 64 or 66.

From the foregoing explanation it is apparent that the system of FIG. 1 recognizes words directly from a plurality of signals representative of speech characteristic groupings. Although the system of FIG. 1 can accurately recognize a vocabulary of words; due to its simplicity the vocabulary of the system must be relatively small. If the system of FIG. 1 is modified by providing means for recognizing phonemes within a speech sound and means for identifying the speech sound by identifying known combinations of the recognized phonemes, the vocabulary of the system is greatly increased. The system of FIG. 1*a* shows a portion of a phoneme-word recognition system according to the present invention that recognizes phonemes within words and uses the recognized phonemes to identify the words.

Referring now to FIG. 1*a* in which circuits corresponding to blocks in FIG. 1 have been identified by the same reference numerals, the output signal from logic 16 is supplied to a phoneme recognition logic 19, the output signal of which is supplied to a word recognition system 20. The input signals supplied to logic 16 are the same as those shown and described in reference to FIG. 1. Phoneme recognition logic 19 is designed to recognize particular phonemes characteristic groupings. In the example chosen for illustration, logic 19 consists of a plurality of combination logic circuits. The individual phonemes recognized by logic 19 produce a sequence of phonemes which are recognized as words by word recognition logic 20.

The theory and operation of the system of FIG. 1*a* will now be explained, reference again being made to the spoken words (alphabetical letters) T and D. Articulation of these words reveals that the words T and D contain the i phoneme (pronounced as the alphabetical letter E) and an additional phoneme, t and d, respectively, before the i phoneme. The phonemes t and d are also present when other words, such as two and due, respectively, are spoken. These latter words are differentiated from the former words by the difference in the final phoneme i or u. It is therefore apparent that if the phonemes of a spoken word can be identified, the vocabulary of the system could be vastly increased by combining various combinations of the recognized phonemes. For example the phoneme d could be combined with the phonemes i or u to identify the words D (dee) or DUE.

Referring again to FIG. 1*a*, phoneme recognition logic 19 has a function similar to the function of recognition logic 17. However, in phoneme recognition logic 19, the feature combination signals from logic 16 are used to recognize phonemes and not words. For example, signals from terminals 43, 47, and 52 are used to detect the d phoneme and the signals from terminals 43, 47, and 51 are used to detect the t phoneme.

FIGURE 5 shows typical circuits of the phoneme recognition logic 19 and of the word recognition logic 20 of FIG. 1*a* that can be used to recognize the words T (tea), Two, D (dee) and DUE, and their homonyms. Since the phonemes t and d are detected by using the same characteristics and circuitry used to detect the words D and T, phoneme recognition logic 19 can be identical to word recognition logic 17 of FIG. 4. Therefore no separate description of the logic 19 of FIG. 5 is required. The output terminals 64 and 66 of logic 19 are coupled to gate-storage circuits 70 and 72, respectively, which can be similar to circuit 54 of FIG. 4*a*. Signals from the output terminals 41 and 42 of FIG. 3 are also supplied as inputs to circuits 70 and 72. Circuit 70 has output terminals 74 and 76 and circuit 72 has output terminals 78 and 80. The presence of an output signal at any one of the terminals 74, 76, 78 or 80 indicates that the word corresponding to that terminal has been spoken.

In order to distinguish between the words T, Two, D, and DUE, information is required concerning the final phoneme, i or u, of the words. This information is supplied by the signals that appear at terminals 41 and 42 of FIG. 3. These signals represent the single equivalent format frequency level (amplitude) of the final segment of the words to be recognized. Referring now to FIG. 5*a*, which shows the relative amplitude of the single equivalent formant frequency signals representative of the phonemes u and i, it can be seen that the i phoneme has a single equivalent formant frequency signal of greater amplitude than that of the u phoneme. When the i phoneme appears at the end of a word segment, a signal will appear at the high amplitude output terminal of quantizer 8 and a corresponding signal will appear at terminal 42. In a similar manner, if the phoneme u appears at the end of a word segment; a signal will appear at the low amplitude output terminal of quantizer 8 and a corresponding signal will appear at terminal 41. Therefore, when output signals appear at terminals 41, 43, 47 and 51 and these signals, which represent all of the characteristics of the t and u phonemes for the vocabulary under investigation, are supplied to circuits 54, 60 and 72 of FIG. 5, all of the characteristics of the two phonemes, t and u, that make up the word TWO are detected and an output signal appears at terminal 76 of FIG. 5. In a similar manner the word T (tea), DUE and D (dee) can be detected at terminals 74, 78, and 80, respectively, when output signals appear at terminals 42, 43, 47, and 51, terminals 41, 43, 47, and 52, and terminals 42, 43, 47 and 52, respectively.

From the foregoing explanation it is apparent that by utilizing a plurality of circuits similar to circuit 54 and by utilizing all of the phoneme feature combination signals appearing at terminals 41 to 52 of FIG. 3 as inputs to these circuits, a large vocabulary of words can be recognized. If it is desirable to make the vocabular even larger, the two level quantizers 8, 10, 12, and 14 of the present invention can be replaced by quantizers having more than two output signal levels. The larger vocabulary systems can also extract and use phoneme characteristics other than those illustrated in FIG. 3. For example, the signal from detector 2 may be differentiated and a multi-level quantizer used to measure the rise time or slope of the differential signal representative of the frequency of the single equivalent formant.

The coupling between the phoneme recognition logic 19 and the word recognition logic 20 can take many forms. If the recognition logic 20 is in the vicinity of the speech input source and the phoneme recognition logic 19, the output of the phoneme recognition logic 19 could be supplied to the word recognition logic 20 by conventional "short-distance" wire or electromagnetic systems. However, the word recognition logic 20 may be located at a considerable distance from the speech input source and the phoneme recignition logic 19. In the latter case, the signal from the phoneme recognition logic 19 will be supplied to the word recognition logic 20 by conventional "long distance" wire or electromagnetic systems. If transmission to the machinery (not shown) that functions in response to the speech wave is desired at a reduced bandwidth, the output of either phoneme recognition logic 19 or word recognition logic 20 could be encoded and then transmitted for decoding and subsequent use. Furthermore, if it is not desirable to go directly from phoneme recognition to word recognition, the coupling between the phoneme recognition logic 19 and the word recognition logic 20 may include syllable recognition logic.

The use of a single equivalent formant concept results in several major advantages over prior art speech recognition systems. First, it reduces the number of speech parameters that must be extracted and supplied to the phoneme recognition system. This feature substantially reduces the size of the phoneme recognition system and thereby of the entire speech recognition system.

Secondly, it simplifies the extraction process itself. To date, extracting the location of the three individual formants of a sound has been a difficult and complicated task, however, extracting the single equivalent formant parameters has been shown to be simple and economical.

The speech recognition system of the present invention makes it possible to command machines by voice messages alone. The system can also be used in the preparation of input information for computer automated data handling processes.

While the present invention has been described with reference to certain preferred embodiments thereof, it will be apparent that various modifications and other embodiments thereof will occur to those skilled in the art within the scope of the invention. Accordingly, I desire that the scope of my invention to be limited only by the appended claims.

What I claim is:

1. In a system for recognizing the intelligence content of an oscillatory electrical signal representative of an acoustic speech wave, first means supplied with said electrical signal to produce a first signal representative at any given time of the period of the first major oscillation of said speech wave occuring after that pitch pulse of said speech wave which immediately precedes said given time, second means supplied with said electrical signal to produce a second signal representative of the peak amplitude of said first major oscillation, third means supplied with said electrical signal for producing a voicing signal, fourth means having a plurality of output terminals and supplied with and responsive to said first signal to produce at those output terminals a first group of signals each of which is representative of a different characteristic of said first signal, fifth means having a plurality of output terminals and supplied with and responsive to said second signal to produce at those output terminals a second group of signals each of which is representative of a different characteristic of said second signal, sixth means having a plurality of output terminals and supplied with and responsive to said pitch signal to produce at those output terminals a third group of signals each of which is representative of a different characteristic of said voicing signal, a group of gating circuits each of which is coupled to different combinations of the output terminals of said fourth, fifth and sixth means to produce an output signal only when a signal is present at each of the associated combination of said output terminals of said fourth, fifth and sixth means, the production of said output signal indicating the presence in said speech wave of specific intelligence content.

2. A system according to claim 1 further comprising a second group of gating networks supplied with and responsive to the outputs of said first group of gating networks to identify other intelligence content of the acoustic speech wave.

3. A system according to claim 2 in which each gating network of said first group of gating networks includes an "AND" gate supplied with and responsive to output signals of said fourth, fifth and sixth means, and a flip-flop circuit having its input connected to and supplied with the output of the "AND" gate.

4. In a system for recognizing the intelligence content of an oscillatory electrical signal representative of an acoustic speech wave, first means supplied with said electrical signal to produce a first signal representative at any given time of the period of the first major oscillation of said speech wave occurring after that pitch pulse of said speech wave which immediately precedes said given time, second means supplied with said electrical signal to produce a second signal representative of the peak amplitude of said first major oscillation, third means supplied with said electrical signal for producing a voicing signal, fourth means having two output terminals and supplied with and responsive to said first signal to produce at one of said terminals an output signal when the amplitude of said first signal is below a selected value and to produce at the other of said terminals an output signal when the amplitude of said first signal is above said selected value, fifth means having two output terminals and supplied with and responsive to said voicing signal to produce at one of said terminals an output signal when the amplitude of said voicing signal is below a selected value and to produce at the other of said terminals an output signal when the amplitude of said voicing signal is above said selected value, sixth means including a differentiator network supplied with and responsive to said second signal and a threshold conduction device having two output terminals and supplied with the output of said differentiator network, seventh means including a threshold conduction device supplied with and responsive to said second signal and a differentiator circuit having two output terminals and supplied with the output signal of said threshold conduction device, and a group of gating circuits each of which is coupled to different combinations of the output terminals of said fourth, fifth, sixth, and seventh means to produce an output signal only when a signal is present at each of the associated combinations of said terminals of said fourth, fifth, sixth and seventh means, the production of said output signal indicating the presence in said speech wave of specific intelligence content.

References Cited

UNITED STATES PATENTS

| | | |
|---|---|---|
| 2,824,906 | 2/1958 | Miller. |
| 3,247,322 | 4/1966 | Savage et al. |
| 3,225,141 | 12/1965 | Dersch. |
| 3,335,225 | 8/1967 | Campanella et al. |
| 3,265,814 | 8/1966 | Maeda et al. |

KATHLEEN H. CLAFFY, Primary Examiner

CHARLES JIRAUCH, Assistant Examiner

U.S. Cl. X.R.

324—77